United States Patent [19]

Sharp et al.

[11] Patent Number: 6,114,687
[45] Date of Patent: Sep. 5, 2000

[54] DOSIMETER DEVICE AND METHOD

[76] Inventors: Michael C. Sharp; M. Kathleen Williams, both of 184 Lystra Estates Dr., Chapel Hill, N.C. 27514; John C. Swartz, 29 Fletcher Cir., Hanover, N.H. 03755-1204; Henry Hsiao, 1915 White Plains Rd., Chapel Hill, N.C. 27514

[21] Appl. No.: 09/074,249

[22] Filed: May 7, 1998

[51] Int. Cl.$^7$ .................................................. H01J 40/14
[52] U.S. Cl. .................................. 250/214 AL; 250/226; 356/419
[58] Field of Search .................................. 250/221, 226, 250/214 AL; 356/416, 419

[56] References Cited

U.S. PATENT DOCUMENTS

| | | |
|---|---|---|
| 607,748 | 7/1898 | Hunt . |
| 3,390,576 | 7/1968 | Yellott ........................ 73/170 |
| 4,069,716 | 1/1978 | Vanasco et al. ................. 73/432.1 |
| 4,308,459 | 12/1981 | Williams ........................ 250/474 |
| 4,372,680 | 2/1983 | Adams et al. .................... 356/51 |
| 4,428,050 | 1/1984 | Pellegrino et al. ............... 364/414 |
| 4,851,685 | 7/1989 | Dubgen ......................... 250/372 |
| 4,935,631 | 6/1990 | Mosley et al. .................. 250/458.1 |
| 4,975,584 | 12/1990 | Benjamin et al. ................ 250/372 |
| 5,008,548 | 4/1991 | Gat ............................ 250/372 |
| 5,306,917 | 4/1994 | Black et al. ................... 250/372 |
| 5,696,381 | 12/1997 | Quintern ....................... 250/472.1 |

*Primary Examiner*—Edward P. Westin
*Assistant Examiner*—Glenn T Kinnear
*Attorney, Agent, or Firm*—Olive & Olive, P.A.

[57] ABSTRACT

A device and method permits detecting, measuring, and recording the intensity of radiation corresponding to a green plant's photoactive spectrum striking a selected site, and utilizing such information alphanumerically and graphically displaying the photoactive radiation exposure in sols incident at the site during a particular portion of a day, an entire day, a week, or an month. The photoactive radiation information provided by the invention device allows gardeners, farmers, researchers and others to match the types of trees, shrubs, crops or other plants that would grow best under the radiation conditions usually incident at the site over a desired, extended time period.

21 Claims, 17 Drawing Sheets

DOSIMETER DEVICE AND METHOD

BACKGROUND OF THE INVENTION

1. Field of the Invention

The present invention relates to a device and method for detecting, measuring, and recording at a selected site the intensity of radiation striking the site which reduces within the spectrum which corresponds to a green plant's known photoactive spectrum, and then, based on the recording, alphanumerically and graphically displaying the photoactive radiation exposure incident at the site during a particular portion of a day, the entire day, week, or month. The photoactive radiation information thus provided enables gardeners, farmers, researchers and others to match the types of trees, shrubs, crops or other plants that grow best under particular radiation conditions with sites having such radiation conditions over desired, extended periods of time.

2. Description of the Related Art

Whether a particular garden, agricultural, exterior or interior site will be exposed to the appropriate amount of radiation is a common question. Like animals, plants occupy specific ecological niches. Plants that are well suited or matched to the lighting intensity usually incident upon the garden in which they grow will grow to their full potential, assuming other plant growth requirements such as the appropriate nutrients and moisture are also present.

The current home gardening industry rates plant light requirements in general terms. Typical terminology used to describe plant light requirements includes such terms as full sun, part sun, and shade. Most often, home gardeners determine a plant's light requirements by guessing whether the light striking their home garden plot is full or part sun, or shade. Often, home gardeners guess incorrectly because they have little sense of the degree of light exposure at a site that has some degree of shading, and as a result the plants selected for a particular site grow poorly or die.

In addition, gardeners frequently ignore the fact that the radiation best for optimum growth for plants (later referred to as plant-active radiation spectrum) is photoactive radiation within the spectrum of approximately 400–750 nm. Also to be recognized is that plants do not use ultraviolet (UV) radiation of approximately 200–400 nm for photosynthesis. In other words, traditional practice ignores the effect of the wavelength content of incident radiation on plant growth. This can be particularly misleading in artificial lighting conditions, where a substantial portion of the wavelengths emitted from the lighting falls outside the photoactive spectrum of 400–750 nm.

Professional growers sometimes depend on light meters that measure instantaneous light intensity over the full light spectrum, either in foot-candles or lux. The professional grower is experienced and has the resources to take numerous readings over time to determine the light usually incident upon a particular site, and may use the information to apply more, less, and/or different artificial lights or to increase shading of the plants. For the home grower, whose light conditions are likely to change dramatically depending on the sun's position in the sky, there has been no device available to record a site's light conditions during different parts of the day and over extended periods of time during a day, week, or month. For a home gardener, and even professionals, taking careful readings over time to determine the instantaneous light intensity usually incident upon a particular site is cumbersome and, thus, unlikely to be started or completed. Furthermore, such readings (in foot-candles or lux) are not particularly relevant to home-gardeners purchasing plants that are merely labeled, full sun, part sun, or shade plants.

Photographers use light meters that detect, measure, and display the instantaneous light radiation intensity at a particular site at a particular time. In addition, there are light meters that measure human exposure to potentially harmful ultraviolet (UV) radiation. A sunburn meter of this type is described in U.S. Pat. No. 4,975,584 issued to Benjamin et al. ("the '584 Patent"). The device disclosed in the '584 Patent comprises a series of stations at selected sites and means for detecting radiation and producing machine-readable signals corresponding to the level of radiation detected at each site. It also incorporates a plurality of sensing stations for transmitting data signals to a central station that processes the data and sends the processed signal to display stations. The device of the '584 patent also employs a display station for processing the signals and display a reading corresponding to the intensity of UV radiation at the station to the public. This device, however, merely informs individuals about the intensity of UV radiation occurring at a particular site at a particular time.

Another personal UV radiometer is described in U.S. Pat. No. 5,008,548 ("the '548 Patent"). The device described in the '548 Patent determines the direction of highest intensity of incident radiation and determines the amount of the incident radiation or dosage. The device of the '548 Patent displays the dosage detected in common engineering units, typically milli-Joules per square centimeter. It also incorporates an alarm that may be actuated upon attainment of a predetermined dosage level set by the user.

U.S. Pat. No. 5,306,917 ("the '917 Patent") discloses an UV radiation detector device intended for medical use. The '917 Patent comprises a sensor unit for detecting UV radiation and transmitting signals corresponding to the intensity of the UV radiation in the device's memory. However, when the device of U.S. Patent '917 is located in the shade, intensity signals will be equal to zero. Therefore, zero signals in this device will not be memorized, in an effort to measure only medically risky radiation levels.

All of the above prior art devices measure intensity of UV radiation accruing at a particular site at a particular time. None of the UV radiation sensors measures photoactive radiation for display of daily, weekly, and monthly photoactive radiation exposure data particular to a specific garden site. Further, none of the prior art devices provide a light filter system that selectively and proportionally attenuates the intensity of incident radiation wavelengths transmitted to a light sensor that have a sub-optimum effect on plant growth.

Therefore, it is one object of this invention to measure, record, and display the intensity of radiation falling within a selected plant's photoactive radiation spectrum and striking a particular site at a particular time and over a specified time period.

A further object of the invention is to provide a light filter system that selectively transmits to a light sensor incident radiation wavelengths of the protective radiation spectrum that have an optimum effect on plant growth.

Another object of the present invention is to provide a light filter system that selectively and proportionally attenuates the intensity of incident radiation wavelengths transmitted to a light sensor that have a sub-optimum effect on plant growth.

It is another object of this invention to provide a method and device for determining the photoactive radiation incident on a particular site in user friendly radiation units identified and labelled by the present invention as "sols."

A further object of this invention is to provide a user's guide, and labels for use in connection with plant products, that describe photoactive light requirements for particular plants in sols.

Other advantages and features of the invention will become apparent from a consideration of the ensuing description and drawings.

SUMMARY OF THE INVENTION

The present invention is directed to a dosimeter device and method for measuring, recording, and displaying the intensity of plant-useable radiation falling within the plant-active spectrum striking a particular site over time. The dosimeter device is used to measure the amount of photoactive radiation striking a site and displays that information for the user in user friendly units identified herein as sols. The device of the invention includes a filter system that selectively transmits light radiation falling within the photoactive radiation spectrum and one or more sensors for detection of such photoactive radiation and generation of at least one analog output signal indicative of the intensity of the photoactive radiation striking the sensor(s). An analog to digital (A/D) converter converts the analog signal to a digital signal for input to a central processing unit. The central processing unit and a clock controls the processing procedures, including the data processing and input/output (I/O) of the device. The device includes a housing covering the electronics of the device and two or more push buttons for a user to request output data from the central processing unit for visual display. An optional interface is available to transmit the photoactive radiation data to a personal computer. The device enables an individual to determine the suitability of a selected site for growth of particular trees, crops, and other plants with regard to the amount of photoactive radiation usually incident on such site by referring to a reference or by referring to plant products sold to consumers that identify the sol requirements for particular plants or a specific plant product.

Other features, aspects and advantages of the present invention will become better understood from the following description, appended claims, and accompanying drawings.

DETAILED DESCRIPTION OF THE INVENTION AND PREFERRED EMBODIMENTS THEREOF

Figure 1:
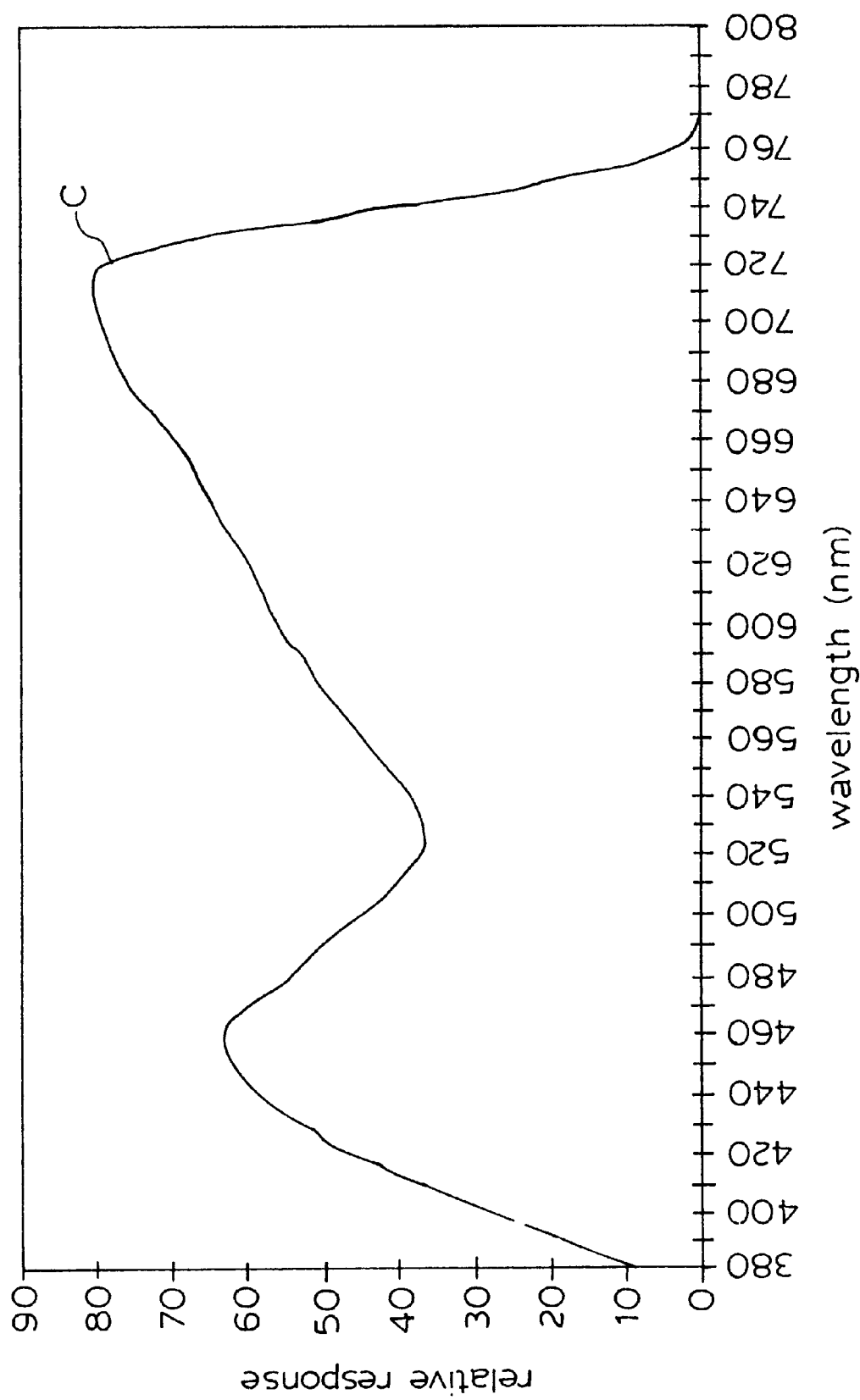
FIG. 1 is a graph representing a typical plant's relative growth response to different radiation wavelengths falling within the plant's photoactive radiation spectrum.

It is well known that plant growth depends on the wavelength content as well as the intensity of the light illuminating the plants. FIG. 1 shows a graph illustrating a typical green plant's relative growth response curve C. Growth response curve C shows a plant's relative growth in response to radiation wavelengths, referred to as photoactive radiation, falling between approximately 380 and 770 nm, hereinafter referred to as the plant-action spectrum. FIG. 1 further illustrates that plants respond differently to different wavelengths within the plant-action spectrum. For example, FIG. 1 shows that plants have a high relative growth response to wavelengths of approximately 450 and 720 nm, and a relatively low growth response to wavelengths of approximately 520 nm. The garden dosimeter of the present invention differentially detects and measures wavelengths having optimum and sub-optimum plant growth potential within the photoactive spectrum, enabling a gardener to more accurately determine the plant-useable light intensity incident at a particular site. By determining the actual amount of plant-useable photoactive radiation usually incident upon a particular site, a gardener will be able to better match particular plants to the site.

Figure 2:
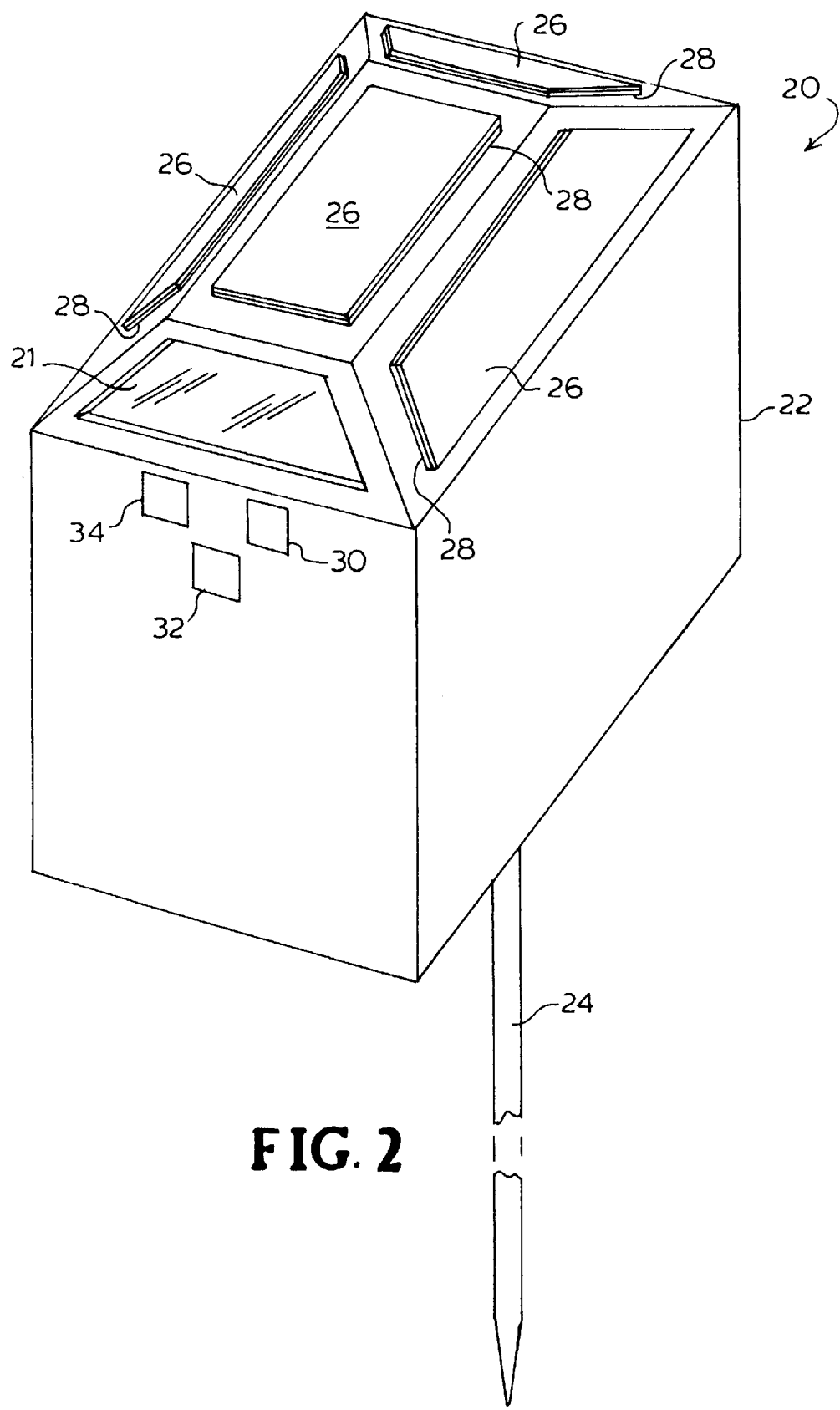
FIG. 2 is a perspective view of a first embodiment of the invention.

As illustrated in FIG. 2 according to a first embodiment, the photoactive dosimeter device 20 of the present invention comprises housing 22 and a pole stand 24 for installation of the dosimeter 20 at a particular site. The present invention could, of course, use any appropriate base in place of pole stand 24 to locate the dosimeter 20 in an appropriate location. The dosimeter device 20 requires at least one filter 26 and one light sensor 28 mounted to housing 22 for selectively transmitting and detecting solar radiation, respectively. The first embodiment illustrated by FIG. 2 shows four filter-sensor stacks each comprised of a filter 26 stacked directly on top of a sensor 28. The dosimeter 20 of the present invention can use silicon photovoltaic or silicon photoconductive sensors, primarily because these are currently economical and widely available. Silicon photosensors use the silicon photovoltaic or silicon photoconductive effect to convert optical energy into electrical energy. Although the embodiments of this invention use silicon photosensors, because of availability, low cost, and ease of use, other devices (for example, pyroelectrics, charge coupled detectors, bolometers, hot-electron bolometers, photo-thermal sensors) that depend on other physical processes to convert optical energy into an electric signal, may also be used. Housing 22 also includes switches 30, 32, and 34 to be described in more detail below.

Figure 3:
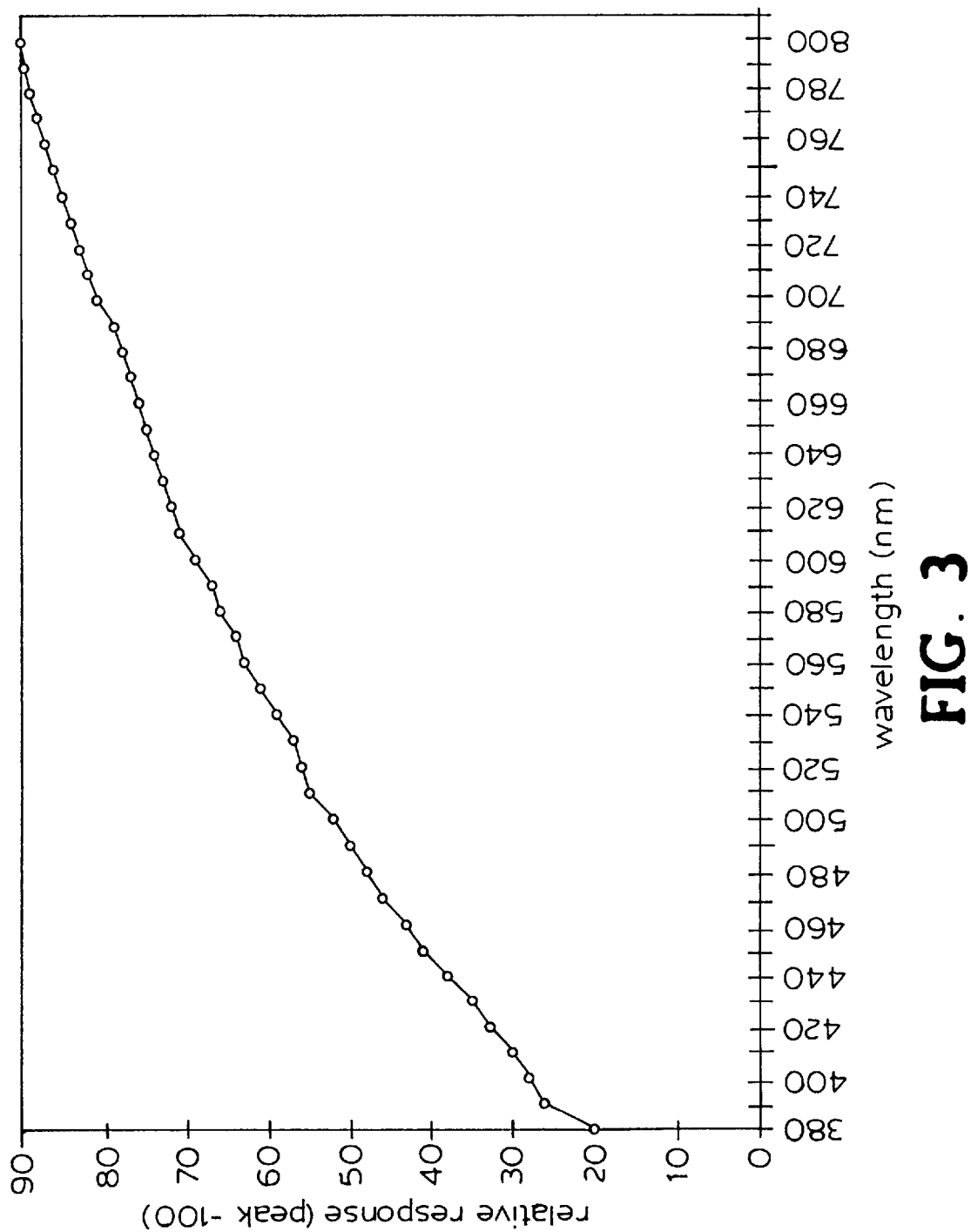
FIG. 3 is a graph representing a typical silicon sensor's relative response to radiation falling between approximately 380 nm and 800 nm.

All sensors 28 have a particular spectral response, i.e.; the electrical signal they generate is a function of the illumination wavelength. However, sensors 28 do not have a spectral response that matches a typical green plant's relative growth response curve C shown in FIG. 1. For example, a typical silicon photovoltaic sensor used to detect radiation intensity, including that of UV radiation, has a wavelength spectral response curve as shown in FIG. 3. Compensation for the spectral response of sensors 28 is provided, according to the invention, by using at least one filter 26 that transmits to an associated sensor 28 a radiation profile, which when applied to the spectral response of the sensor causes the sensor to generate a signal that mimics the growth response curve C shown in FIG. 1. In other words, referring to FIGS. 1 and 2, each filter 26 transmits to its associated light sensor 28 proportionally less of those wavelengths of approximately 530 nm and proportionally more of the photo-useable wavelengths of approximately 450 and 720 nm, such that the signal generated by sensor 28 mimics a typical plant's growth response curve as shown in FIG. 1. A refractive lens cap (not shown) may be placed over each associated filter 26 and sensor 28 to protect them from adverse weather conditions.

Figure 4:
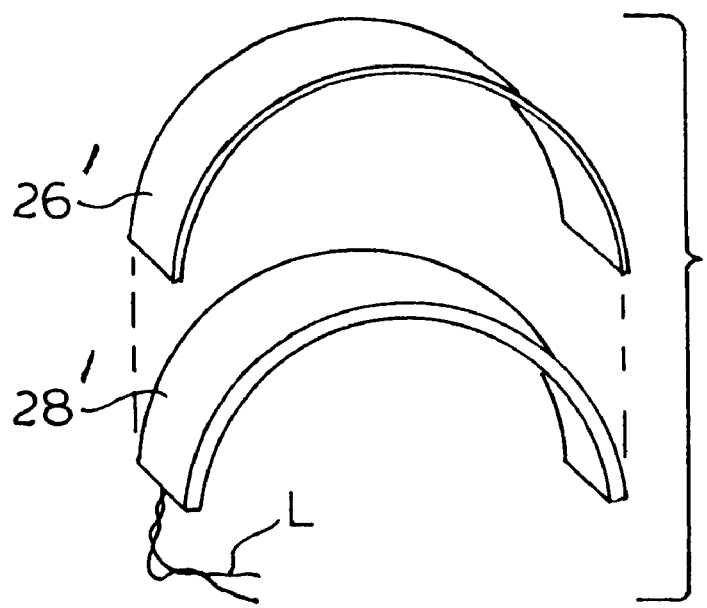
FIG. 4 is a perspective drawing of a hemispherical shaped filter-sensor stack according to a second embodiment of the invention.

FIG. 4 shows in a second embodiment a filter and sensor combination comprised of at least one hemispherical glass or plastic filter 26' stacked and attached on top of a complementary hemispherical sensor 28'. This hemispherical filter-sensor stack arrangement receives radiation from opposing horizons as the sun appears to move across the sky, thus more accurately measuring the radiation striking a particular site throughout the day. Alternatively, a hemispherical lens covering a planar filter sensor stack could also be used to collect light from the entire sky and surroundings and focus the light on the sensor.

Figure 5:
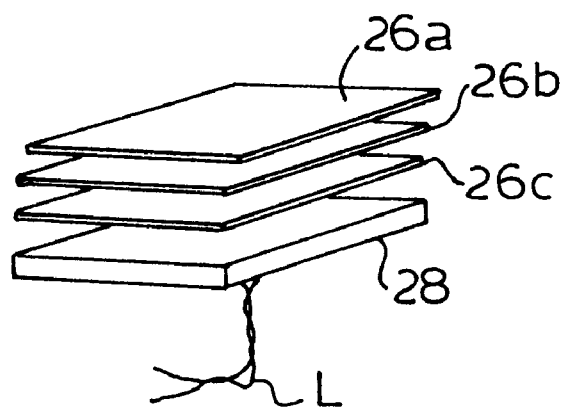
FIG. 5 is a perspective drawing of a planar filter-sensor stack according to a third embodiment of the invention.

FIG. 5 shows a detailed view of a third embodiment of the invention in which three filters 26a, 26b, and 26c are stacked above a sensor 28. Acting in combination, filters 26a, 26b, and 26c transmit to sensor 28 that part of the incident radiation that corresponds to the photo-active spectrum by selectively transmitting wavelengths within approximately the 380–770 nm range and refusing transmission of radiation wavelengths that fall outside this range. Acting in combination, filters 26a, 26b, and 26c also de-emphasize (attenuate) radiation having wavelengths within this range that are not as photoactive as other wavelengths that fall within the photoactive spectrum. For example, radiation having wavelengths around approximately 520 nm are proportionally attenuated, such that the intensity of radiation of approximately 520 nm striking sensor 28 is proportionally less than the intensity of those wavelengths striking the filter. Filters 26a, 26b, 26c fully transmit to sensor 28 incident radiation of approximately 450 and 700 nm. Thus, the radiation transmitted to sensor 28 by filters 26a, 26b, and 26c in combination with the sensors intrinsic spectral response, produce a sensor output signal that mimics a typical plant's growth response to such radiation as illustrated in FIG. 1.

For purposes of disclosure, the filter-sensor stack of each embodiment of the invention is described by the following formula. When a sensor 28 used by the dosimeter device 20 of the invention is struck by radiation it produces an electrical output which is a function of illumination wavelength, $D(\lambda)$, and the nth filter attenuates light as a function of wavelength, $Fn(\lambda)$. The electrical output of the filter sensor stack of the invention is, for n filters:

$$\int_\lambda D(\lambda)S(\lambda)d\lambda \text{ where } S(\lambda) = \prod_{i=1}^{n} Fi(\lambda)F_2(\lambda)\ldots Fn(\lambda)$$

Figure 6:
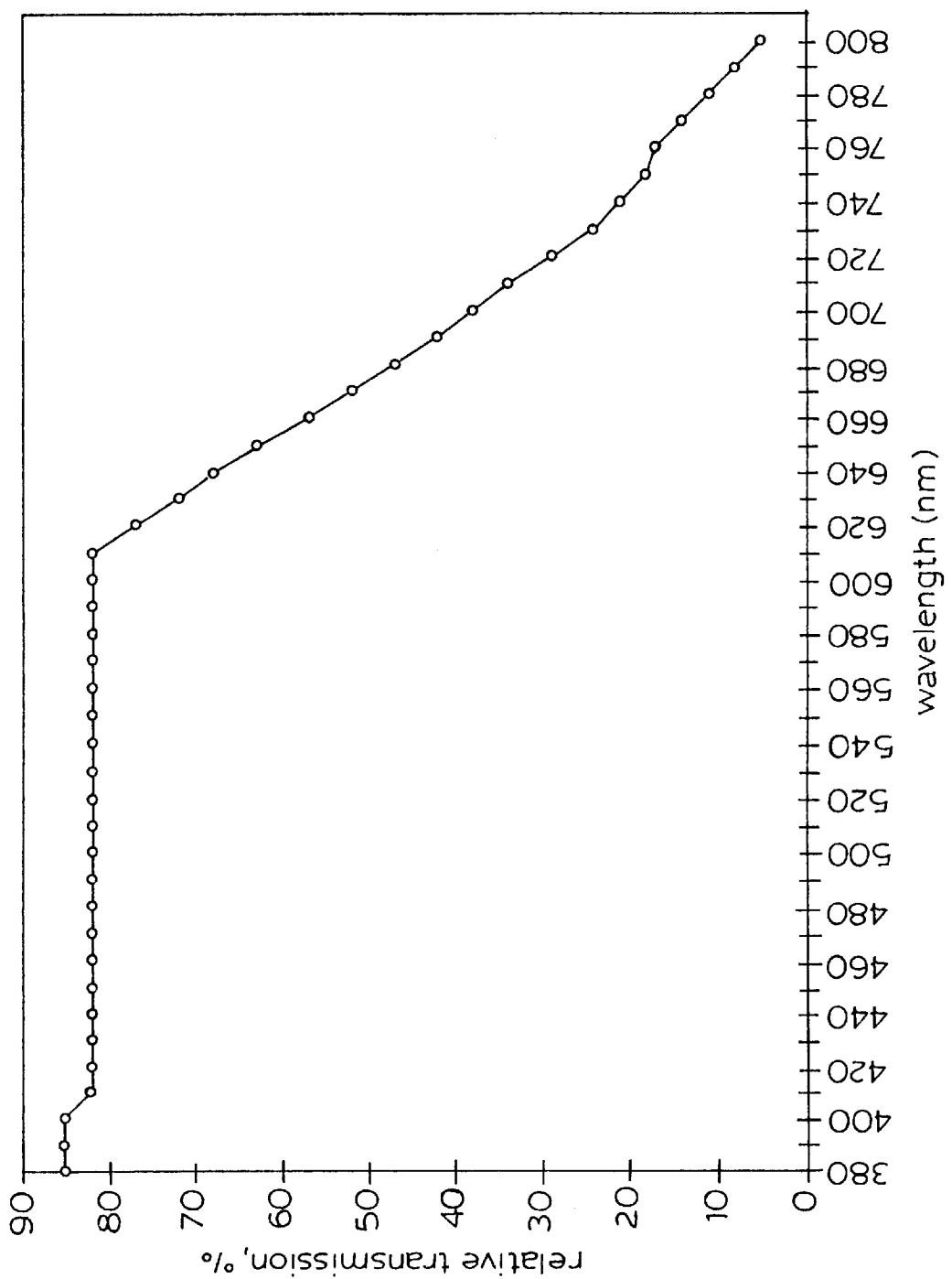
FIG. 6 is a graph representing the relative transmission of a Hoya HA-15 filter.
Figure 7:
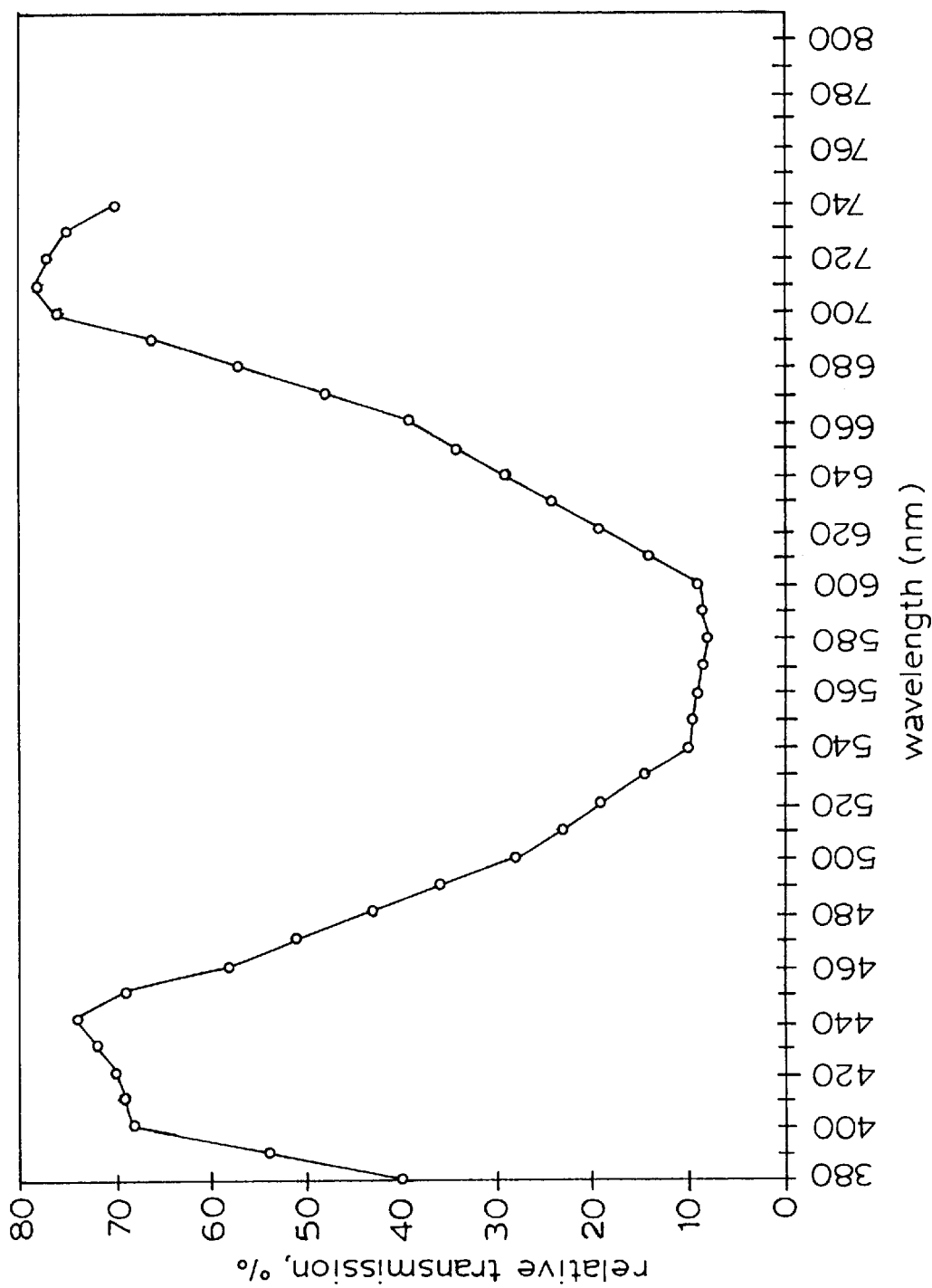
FIG. 7 is a graph representing the relative transmission of a Rosco #58 filter.

The filter-sensor stack as shown in FIG. 5 is comprised of three separate glass or plastic absorption filters as follows (the filters may be stacked in any order without affecting operability of the invention):

(1) Hoya HA-15 (2.5 mm thick), e.g. filter 26a, having a spectral curve (relative transmission) shown in FIG. 6;

(2) Rosco #58 filter, e.g. 26b, characterized by a spectral curve as shown in FIG. 7; and a (3) Rosco #3114 filter, e.g. 26c, which is an UV filter absorbing about 90% of wavelengths below 390 nm.

Figure 8:
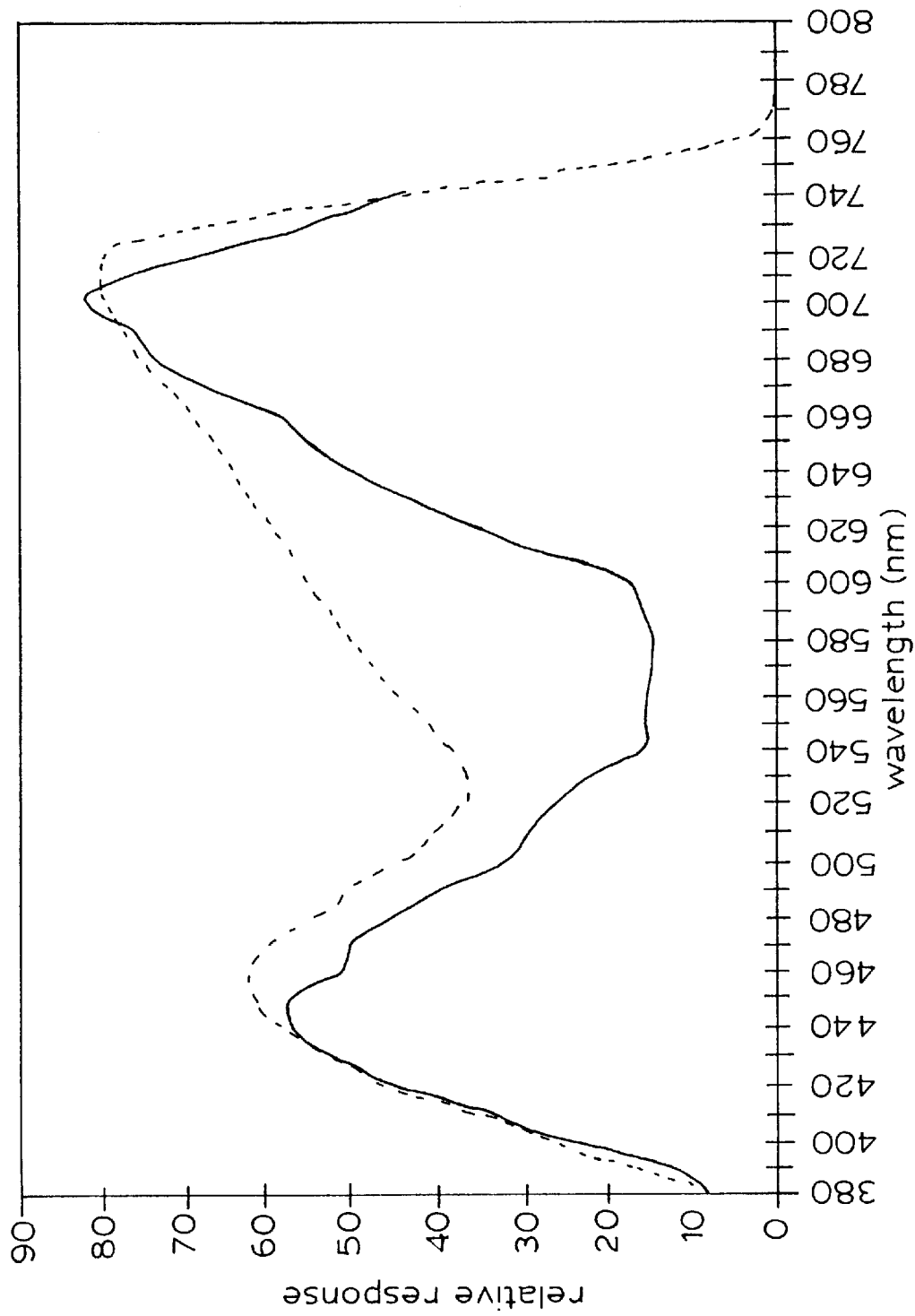
FIG. 8 is a graph illustrating the relative spectral response curve (dotted line) of the planar filter-sensor stack illustrated in FIG. 5 as compared with the desired photoactive radiation (solid line).

FIG. 8 shows that the spectral response curve or relative transmission of the filter-sensor stack of FIG. 5 approximately mimics the spectral response of plants to photoactive radiation.

Figure 9:
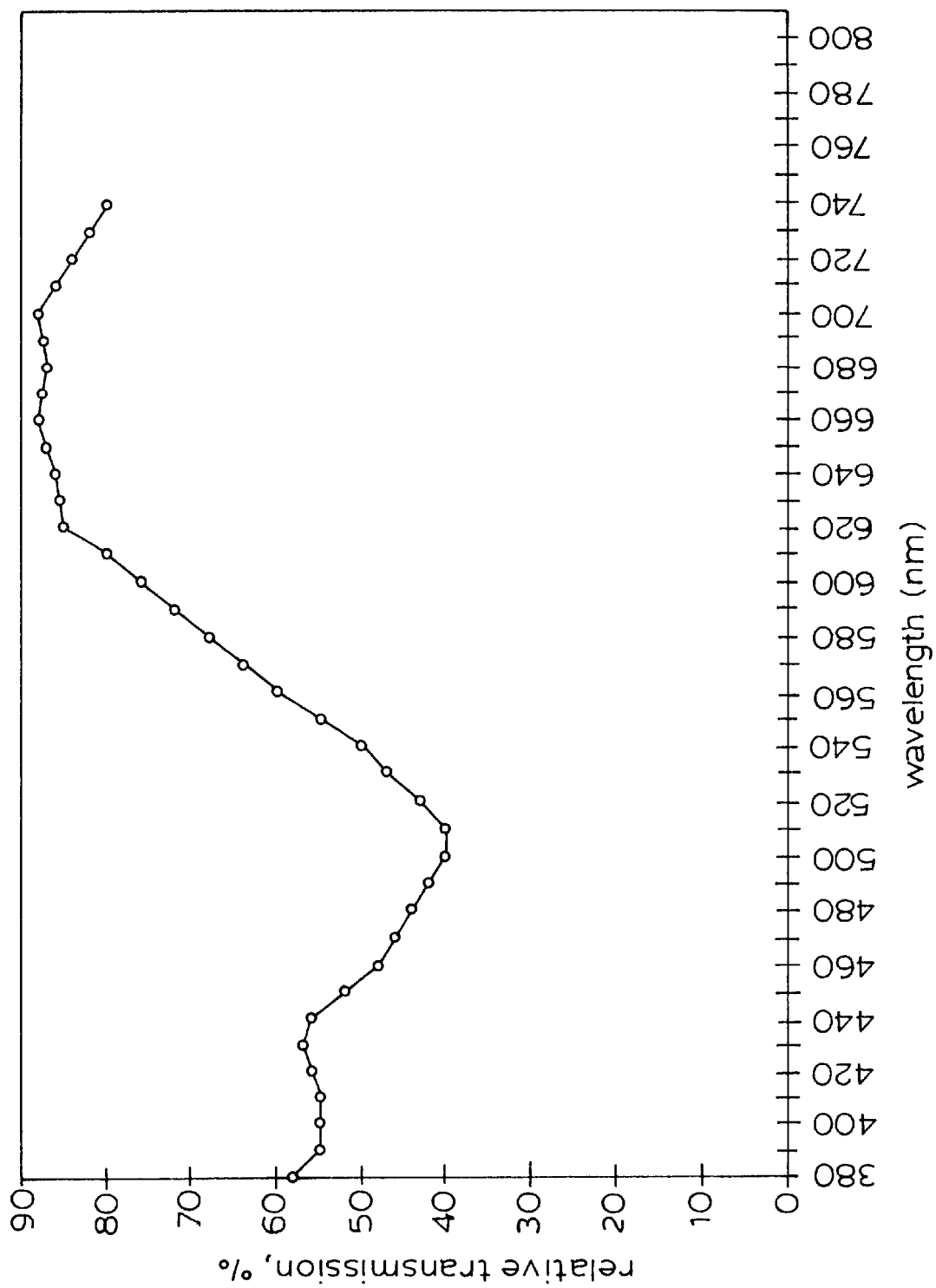
FIG. 9 is a graph illustrating the relative spectral response curve of a Rosco #1 filter.

Another embodiment of a filter-sensor stack (not shown) is a combination of four filters stacked on top of a silicon sensor as follows:

(1) Hoya HA-15 filter (2.5 mm thick) (FIG. 6);

(2) Rosco #58 filter (FIG. 7);

(3) Rosco #1 filter characterized by a spectral curve as shown in FIG. 9; and a (4) Rosco #3114 filter.

Figure 10:
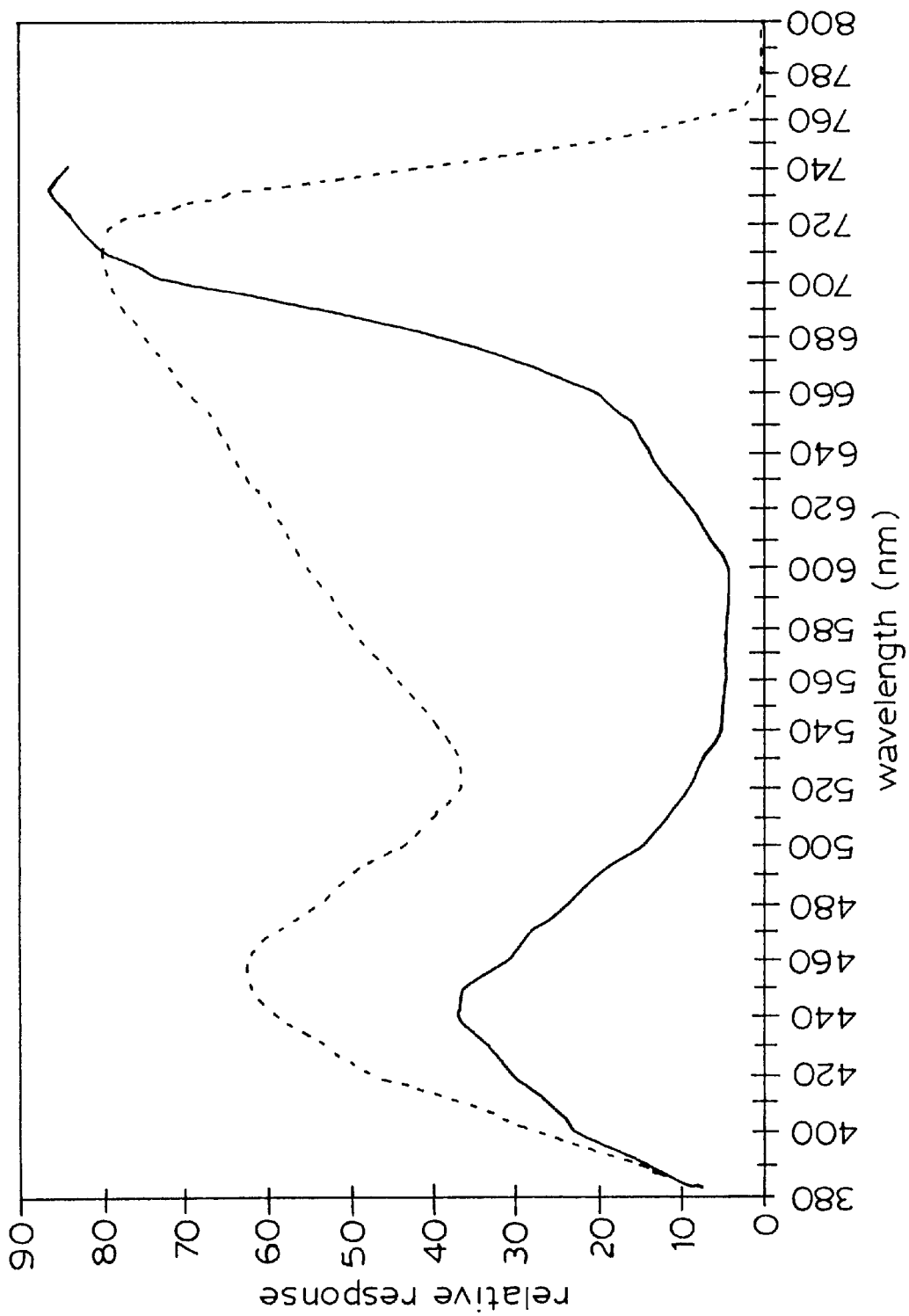
FIG. 10 is a graph illustrating the relative spectral response (solid line) of a four filter, filter-sensor stack compared to the plants desired spectral response curve (dotted line) according to a fourth embodiment of the invention.

FIG. 10 shows a plant's spectral response curve (dotted line) compared to the relative response curve (solid line) of the embodiment described immediately above.

An operable combination of filters recognized by the invention and that utilize dielectric stack filters to replace the Hoya-15 and Rosco 3114 would be, LPF-400-2X2 and SPF750-2X2 (both manufactured by CVI Optics). Although the invention recognizes that custom multi-layer dielectric stack filters could be engineered for each frequency range of interest, the invention also recognizes that this would be expensive.

Figure 11A:
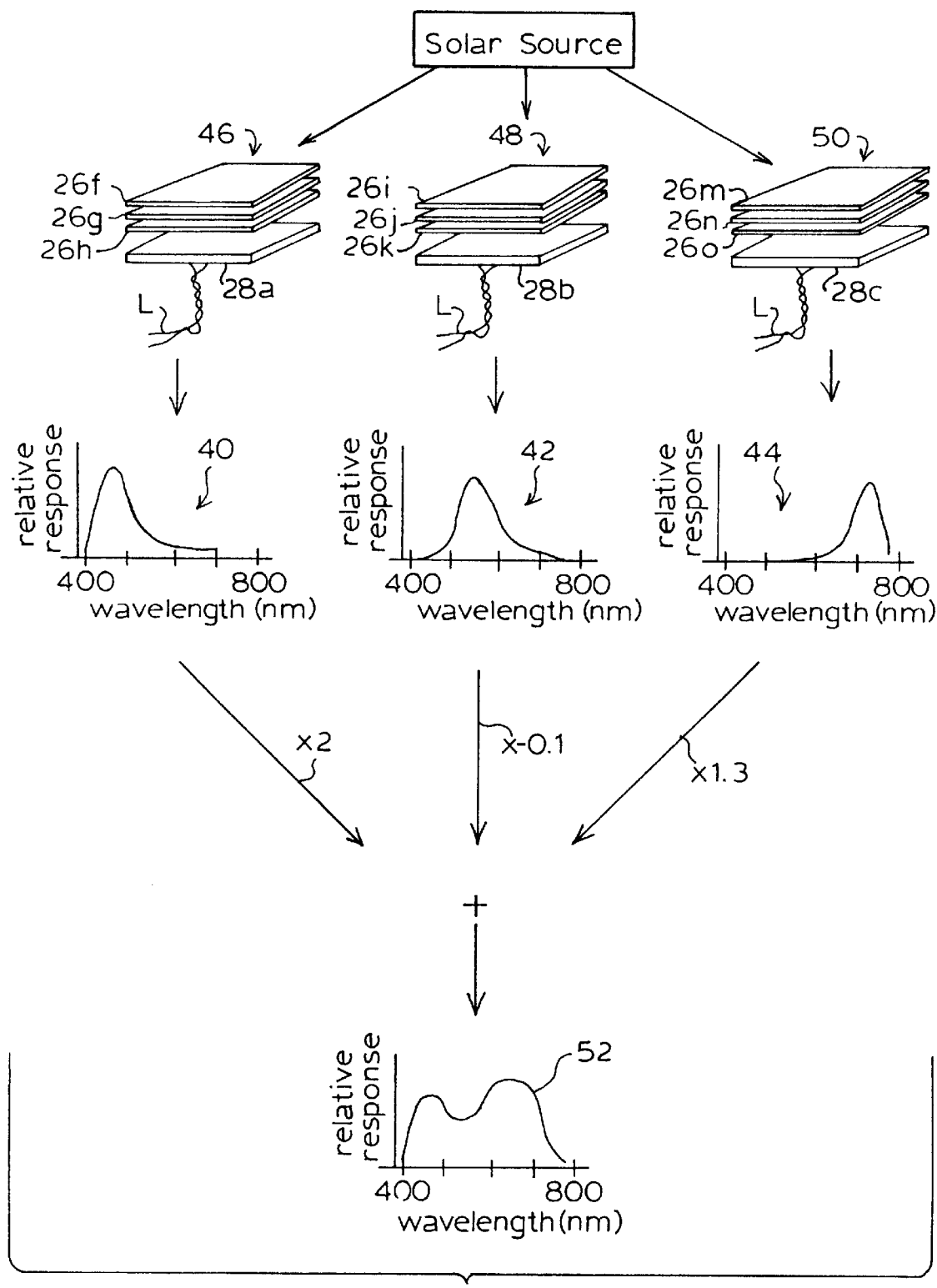
FIG. 11A is a flow chart illustrating a fifth embodiment of the invention and its operation.

In the previously described filter-sensor stack embodiments a multiplicity of filters alter the spectral response of a single sensor, so that the filter-sensor stack produces a net spectral response that mimics the plant action spectrum. In a fifth embodiment of the invention illustrated in FIG. 11A, the dosimeter device 20 (FIG. 2) of the invention uses a multiplicity of filter-sensor stacks, each measuring the amount of light in different spectral ranges. The filter-sensor stack system as shown in FIG. 11A is comprised of identical sensors 28a, 28b, and 28c each covered by a filter stack comprising filters 26f, 26g, and 26h; 26i, 26j, and 26k; and 26m, 26n, and 26o, respectively. The three filters in each filter-sensor stack 46, 48, 50 are listed in the following chart, along with the corresponding weighting factors:

| Detector-Filter Set | Filters Used | Weighting Factor |
|---|---|---|
| 1 | Rosco #26, Rosco 3ll4, and Hoya 15 | 2.0 |
| 2 | Rosco #69, Rosco 3114, and Hoya 15 | 1.3 |
| 3 | Rosco #89, Rosco 3ll4, and Hoya 15 | −0.1 |

Figure 11B:
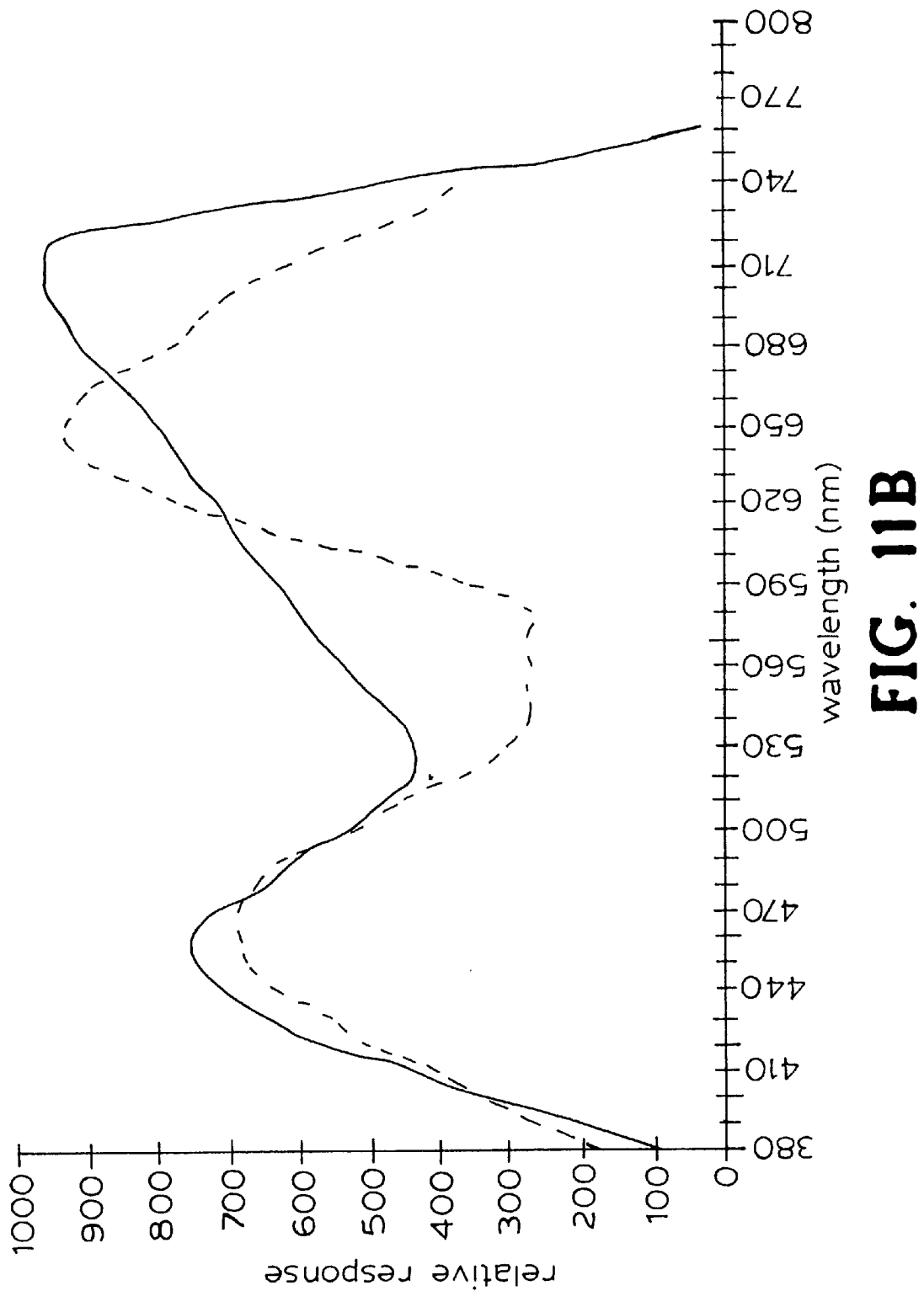
FIG. 11B is a graph illustrating the relative spectral response of the embodiment illustrated by FIG. 11A.

Referring again to FIG. 11A, the relative response of each filter-sensor stack 46, 48, and 50 is shown by graphs 40, 42, and 44. The signal processing unit 23 (FIG. 14) samples the signal corresponding to each filter-sensor stack 46, 48, and 50 and multiples the sampled reading by the corresponding weighting factor 2, 0.1, and 1.3, respectively, to yield an intermediate result for each stack. The signal processing unit 23 sums these intermediate results to yield an overall relative spectral response 52. Note, that analog circuits could also perform the weighting and summation, however the use of the computer and software algorithm is less expensive and more flexible. By choosing appropriate filters, sensors and weighting factors, the overall relative spectral response 52 of the embodiment of the invention as shown in FIGS. 11A and 11B mimics a typical plant's growth response to photoactive radiation. In addition, by changing the filters or the weighting factors, the spectral response of the system may be altered to mimic a different response spectrum. This may be useful if it is determined that different plants or species have different spectral requirements. In addition, the dosimeter 20 can be designed according to the invention so that the signals from each sensor-filter stack 46, 48, and 50 are independently recorded, hence independently recording the amount of light in each spectral region. If specific spectral requirements are identified for different plants, this additional spectral information may be useful to the plant grower to determine not only the amount of light but also the spectral content over time.

The fifth embodiment illustrated by FIGS. 11A, and 11B is further described by use of a simple mathematical algorithm. Mathematically, the spectral output signal $0(\lambda)$ for a given illumination wavelength, $\lambda$, is a weighted sum:

$$0(\lambda) = D(\lambda) \sum_n \frac{A_n}{A_D} S_n(\lambda)$$

where $D(\lambda)$ is the intrinsic response of each sensor of area A; $S_n(\lambda)$ is the net spectral response of the filter covering the sensor; and $$\sum_n$$

is the weighting factor for the nth filter-sensor stack. For light with a broad spectral distribution $I(\lambda)$, the output signal for a given illumination is:

$$0 = \int_\lambda I(\lambda) 0(\lambda) d\lambda.$$

In all cases the total sensor area, $A_D$, is the sum of the individual sensor areas:

$$A_D = \sum_n A_n.$$

Note that, in general, each of the n sensors, their areas, and associated filters could be different. However, in many applications, the individual sensors could be identical (within manufacturing tolerances) so that:

$D_n(\lambda) = D(\lambda)$ and $A_n = A$.

Figure 12A:
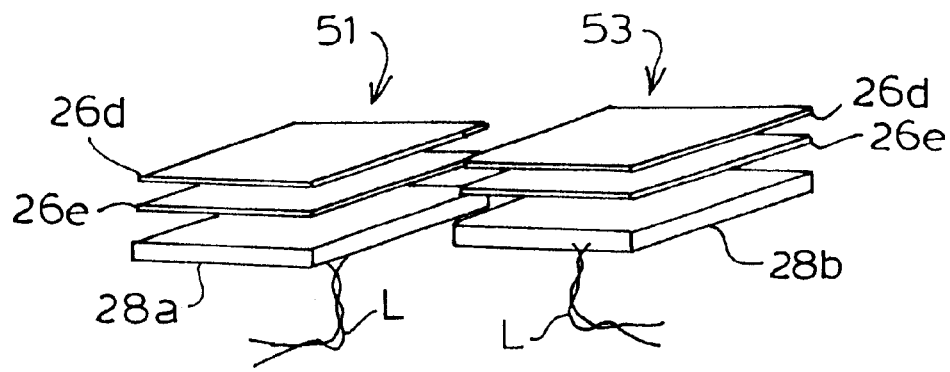
FIG. 12A is a perspective view of a dual planar filter-sensor stack according to a sixth embodiment of the invention.
Figure 12B:
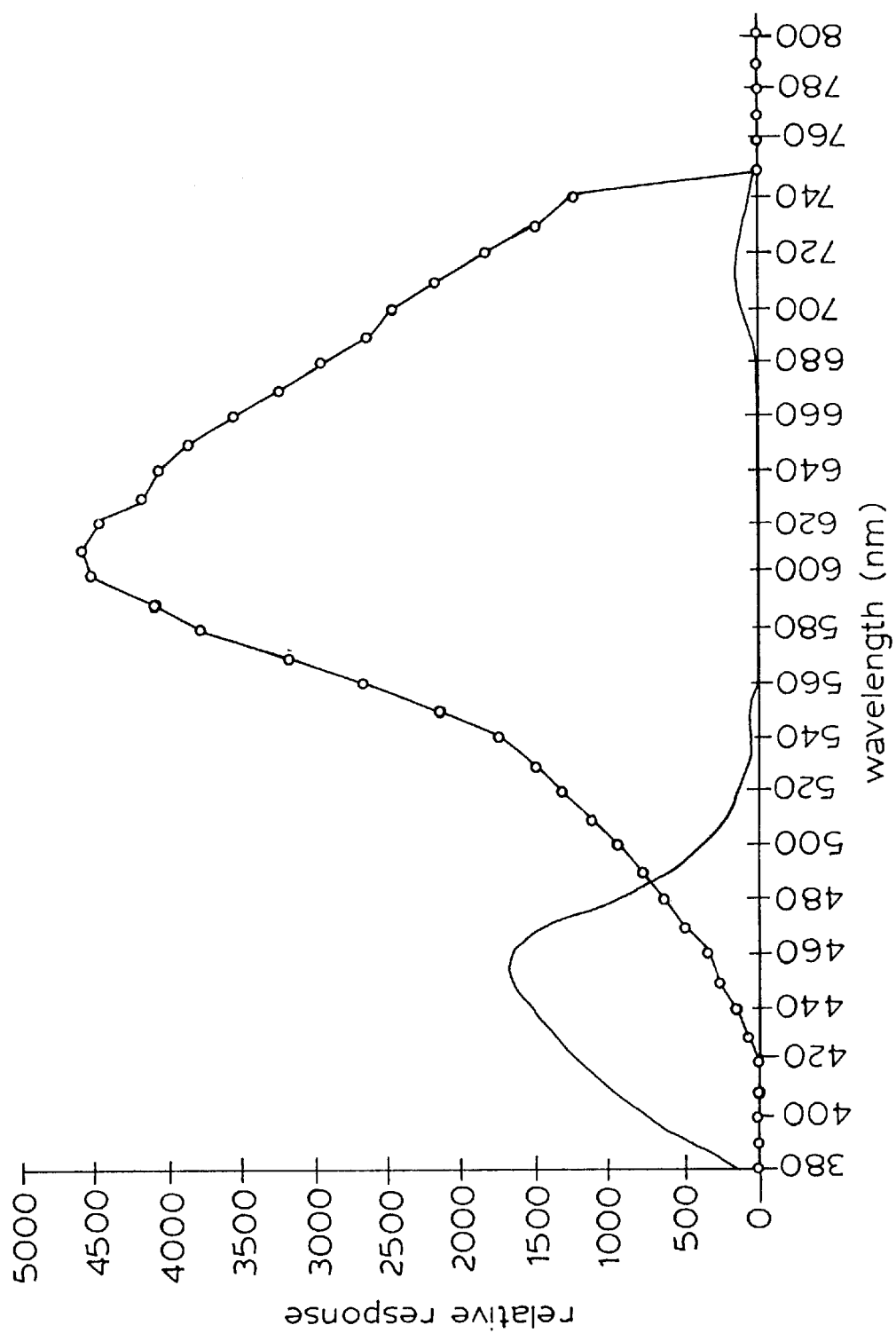
FIG. 12B is a graph illustrating the relative spectral response of each dual planar filter-sensor stack illustrated in FIG. 12A.
Figure 12C:
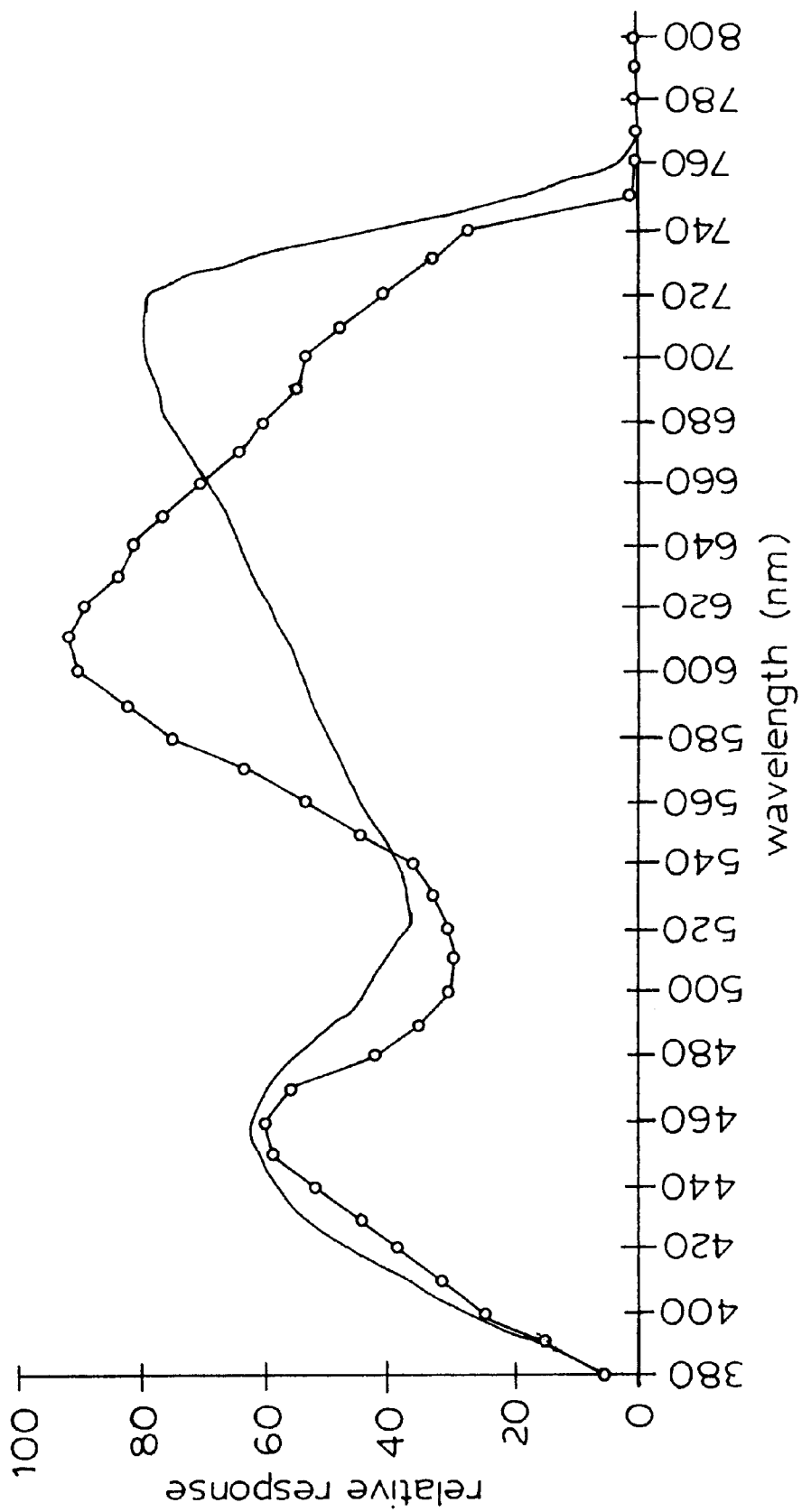
FIG. 12C is a graph illustrating the spectral response of the sixth embodiment illustrated in FIG. 12A.

By way of an additional example of the invention, FIG. 12A is a sixth embodiment that shows two independent filter-sensor stacks 51, 53. Filter-stack 51 is comprised of filters 26d and 26e stacked on top of sensor 28a. Filter-sensor stack 53 is comprised of filters 26d and 26e stacked on top of sensor 28b. Filter-sensor stack 51 uses Hoya HA-15 (3 mm thick) and Hoya B- 440 (2.5 mm thick) filters. Filter-sensor stack 53 uses Hoya HA-15 (3 mm thick) and Rosco #20 (single sheet) filters. The relative transmission curve for each filter-sensor stack is illustrated in FIG. 12B. Multiplying 1.6 times the signal from the first filter-sensor stack 51 and adding to it one times the signal from the second filter-sensor stack 53 yields a spectral response approximating the plant action spectrum as shown in FIG. 12C.

Figure 13:
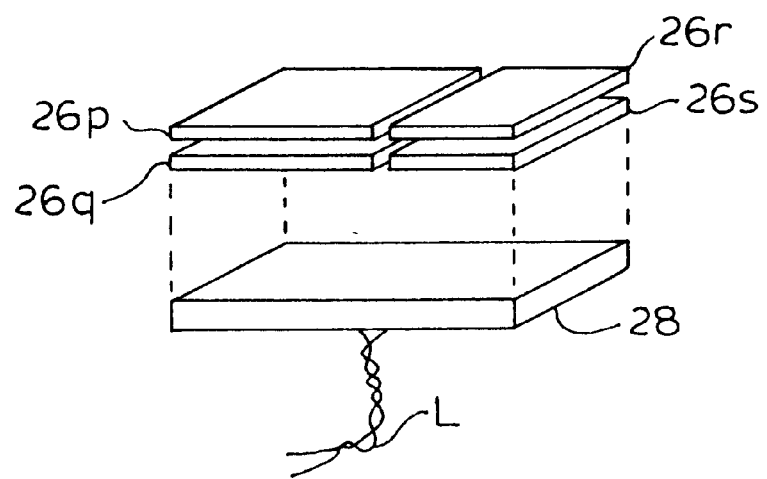
FIG. 13 is a perspective view of a dual planar filter-sensor stack comprising a seventh embodiment of the invention.

In a final seventh embodiment illustrated in FIG. 13, a first filter stack is comprised of a Hoya HA-15 (3 mm thick) filter and a Hoya B-440 (2.5 mm thick filters, 26p and 26q respectively, positioned over one portion of sensor 28. The other filter stack is comprised of a Hoya HA-15 (3 mm thick) filter and a Rosco #20 filter, 26r and 26s respectively, positioned over another portion of sensor 28. If the first mentioned filter stack covers 1.6 times more sensor 28 area than the second filter stack, the net resulting signal from the sensor 28 yields a spectral response curve (not shown) again approximating the plant action spectrum curve.

For purposes of disclosure, the final seventh embodiment shown in FIG. 13 is described by the following formulas. For n filter stacks each with a spectral transmission $S_n(\lambda)$ and covering an area $A_n$ of the detector, the net spectral response $0(\lambda)$ of this arrangement is $$0(\lambda) = D(\lambda) \sum_n \frac{A_n}{A_D} S_n(\lambda) \quad (1)$$

where $D(\lambda)$ is the detector's intrinsic spectral response and the total area of the detector $A_D$ is, again, $$A_D = \sum_n A_n \quad (2)$$

As recognized by the invention, these equations show that by using multiple filters covering different proportions of the detector surface one could tailor the spectral response of the net detector-filter system to match a wide variety of desired spectral responses $0(\lambda)$.

Further embodiments of the invention can derive from use of equations (1) and (2) shown immediately above. For example, the invention recognizes that the filter stacks covering the detector could be changed to change the spectral response of the dosimeter. This change could be accomplished, according to the invention, by having interchangeable sets of filters that could be removed and replaced over the detector. Another method of achieving the same result as recognized by the invention would be to have the spectral response filters (Filters Sn) cover equal portions of the detector, and then use individual neutral density filters of varying attenuations covering each spectral filter Sn to adjust the amount of light and hence the amount of signal proportionally generated by the detector for each spectral portion.

The dosimeter device 20 of the invention includes a computerized system for receiving, storing, and manipulating output from the previously referred to sensors 28 of the invention, and further causes the output requested by an user to be displayed on display 21 (FIG. 2). One form of the computerized system is described below particularly in reference to FIGS. 14–16. However, it is to be understood that a computerized system suitable for use with dosimeter 20 of the invention can be constructed using different components and arrangements than those described below as is generally known and will be understood by those in the computer arts.

Figure 14:
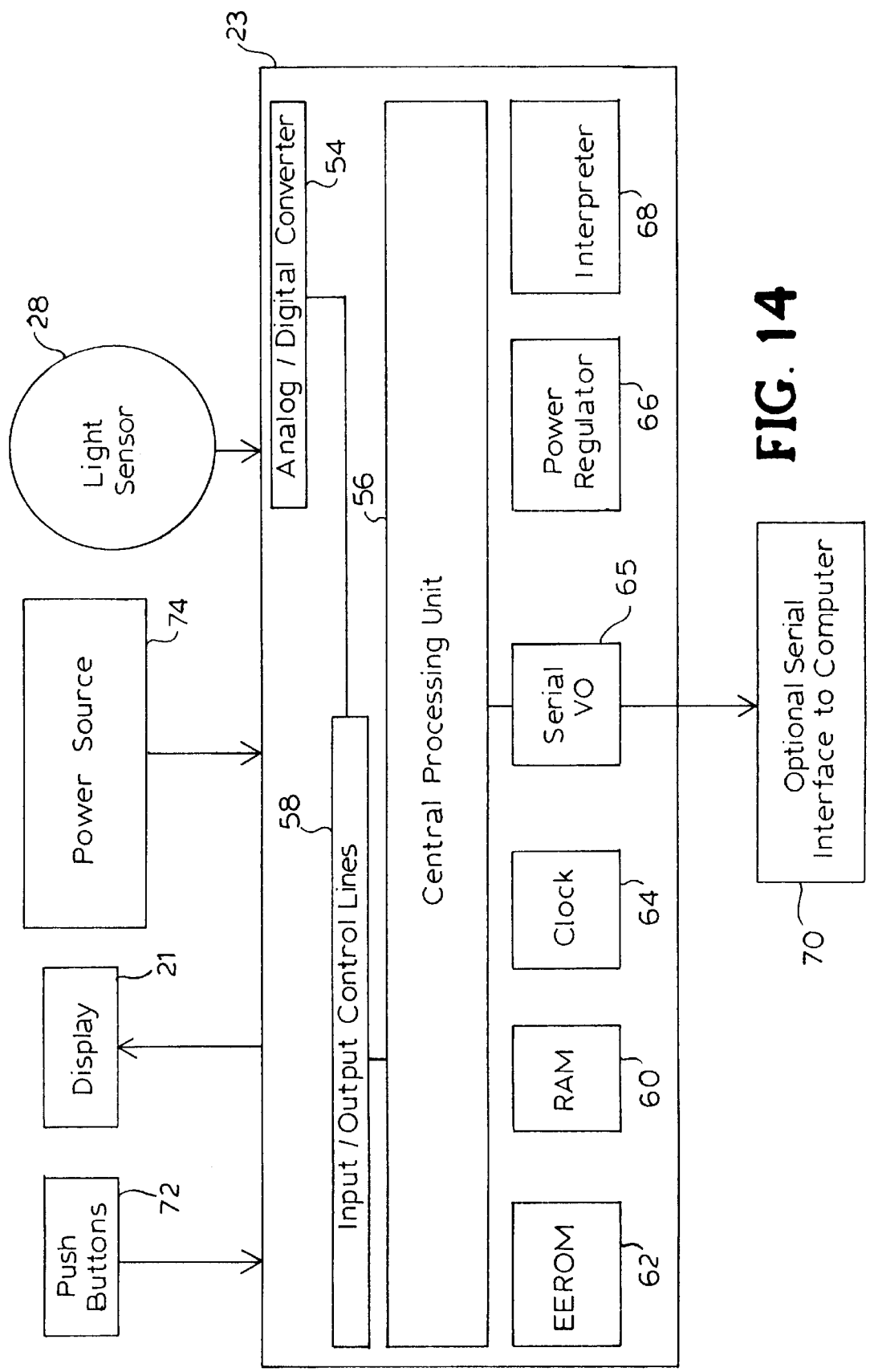
FIG. 14 is a block diagram showing the input and output devices and signal processing unit of the invention.

Sensors 28 are photocells that detect photoactive radiation transmitted to the sensors through a filter 26 or through one or more filter stacks as discussed above, and convert the radiation into a corresponding analog signal proportional to intensity of the photoactive radiation striking a sensor. An electrical lead L is connected to each sensor 28 as shown in FIGS. 4, 5, 11A, 12A, and 13 for coupling sensor 28 to the analog-to-digital converter 54 of the signal-processing unit 23. Referring to FIG. 14, an A/D converter 54 is shown as part of the signal processing unit 23; this grouping is simply for convenience. Commercially available sensor-A/D converter combinations are available and could be used in the circuitry of the invention. From the standpoint of functionality, however, whether the same A/D converter physically resides as part of the signal processing unit 23 or as part of the sensor, the operation of the invention is unchanged. Again referring to FIG. 14, the signal-processing unit 23 illustrated by way of example is comprised of the following standard components:

analog-to-digital converter (A/D) 54;
central processing unit (CPU) 56;
input/output control lines (I/O) 58;
random-access-memory (RAM) 60;
read-only-memory (EEROM) 62;
clock-signal generator 64;
power regulator 66; and
interpreter 68.

At least one sensor 28 is connected to A/D 54. A/D 54 is connected to CPU 56 through I/O control lines 58. RAM 60 and EEROM 62 are interactively connected to CPU 56. Also connected to the CPU 56 is a computer interface port 70 through serial VO 65 for downloading data collected by the invention to a separate computer (not shown). Located on the housing and electrically coupled to signal processing unit 23 are switch controls or push buttons 72, a display 21, and a power source 74. The power source for the present invention could, as recognized by the invention, comprise a solar panel and/or a rechargeable battery. Alternatively, the dosimeter device 20 of the invention could be connected to an AC power system, for example, that provides power to a gardener's home or other establishment. Switch controls 72, labelled as "push buttons" in FIG. 14, are comprised of switches 30, 32, 34 (FIG. 2). In the preferred embodiment, switches 30, 32, and 34 are common push buttons. Push button 30 activates display 21. Buttons 32 and 34 generate input signals to central processor 56 requesting the processor 56 to provide output to display 21. Push buttons 32, 34 are also used to input time and date information into signal processing unit 23.

The output of sensor(s) 28 generates at least one analog signal corresponding to the intensity of the photoactive radiation incident upon sensor(s) 28. Each sensor transmits an analog signal to the A/D converter 54 through electrical leads L. A/D converter 54 converts the analog signal to a digital signal for signal processing by the central processing unit 56. EEROM 62 is a storage device for storage of the digital data. The CPU program and clock 64 control the processing of the photoactive radiation data stored in the EEROM 62 and displays the processed information on display 21. The CPU program can calculate the amount of total radiation, average radiation, and peak radiation that occurs during a specified time period, preferably the morning, afternoon, or the entire selected day. The CPU program also provides total, average, and peak photoactive radiation values for a time period greater than one day, for example, a week to months depending on the capacity of the storage device. The CPU program also sums more than one sensor 28 output signal, and assigns a total output signal that mimics the plant action spectrum, for central processing unit 56 processing.

Figure 15:
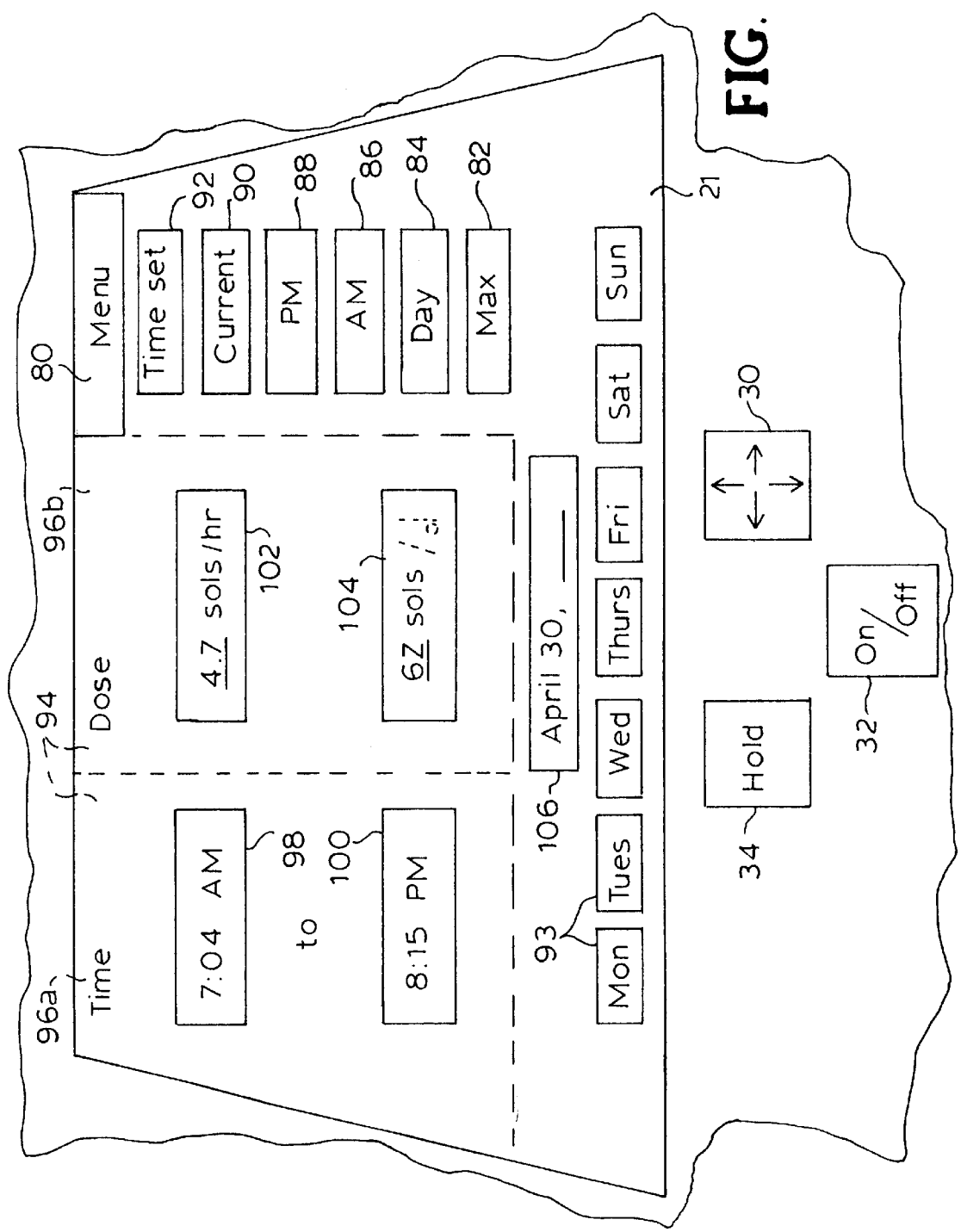
FIG. 15 is a schematic diagram of the display panel and switches shown incorporated into the first embodiment of the invention of FIG. 2 and operative to display first selected photoactive radiation exposure data.

A gardener operation of the dosimeter device 20 for display of such information is now explained in more detail. Referring to the display illustrated by FIG. 15, menu 80 is located along the horizontal bottom and a vertical side of display 21. Along the bottom of display 21, menu 80 is comprised of horizontal menu items corresponding to the days of the week 93, Sun., Mon., Tues., Wed., Thurs., Fri., and Sat. Along the vertical side of display 21, menu 80 is comprised of menu items identified as maximum 82, days 84, a.m. 86, p.m. 88, current 90, and time set 92. Display 21 is also comprised of a data display section 94. Data display section 94 is comprised of a time section 96a and a dose section 96b. Time section 96a is comprised of first time window 98 and a second time window 100, together indicating the time span for which the user wants to obtain plant-active radiation information. Dose section 96b includes an average dose window 102 and a total/maximum window 104 for display of total or maximum photoactive radiation for the selected time span selected as indicated in time section 96a. Although FIG. 15 shows a particular menu and button arrangement, it is clear that numerous arrangements could be used effectively as well. Changes in the detail and structure of the display as shown in FIG. 15 may be made without departing from the spirit of the invention.

The photoactive radiation is displayed in a user friendly unit identified as a sol. The invention treats one sol per hour as being equal to 1000 foot-candles. The amount of sols recorded by the dosimeter 20 of the invention can then be compared to a brochure or catalog describing known plant requirements in sols. For example, Impatiens require partial shade and approximately 2000 to 4000 foot-candles. Therefore, Impatiens will thrive in a site that receives an average of 3.5 sols/hr or 50 sols in the period of an average summer day. Plants requiring "full sun" (8000–10,000 foot-candles) such as sunflowers or corn, will thrive in a site where the device of the invention records a maximum exposure of not less than 8 sols/hr. and not less than 100 sols/day. The method of the present invention includes the step of establishing a reference listing the radiation requirements of a wide assortment of garden trees, shrubs, and plants, as well as farm crops and their corresponding radiation requirements in sols. The invention method also includes the practice of labelling different plants, seed and bulb packages, and like plant products with the optimum amount of sols required by the particular plant so that the home gardener can refer directly to the retail or wholesale plant product to obtain the information provided by the invention. Therefore, the present invention will allow a gardener to measure the actual photoactive radiation incident upon a garden site, and more accurately select the appropriate plant or plants for the garden site.

A user activates and subsequently deactivates display 21 by pushing button 32. The default setting of the device is set to the date upon which the device is activated. Window 106 shows the date of activation, or the date or dates subsequently selected by the user. Deactivation of display 21 will also occur automatically if either button 30 or 34 is not pressed within a selected time period. Once display 21 is activated, a user can select items from the menu by pushing button 30 to scroll right, left, up, and down through menu 80 by selectively pushing the right, left, up, and down arrows, respectively, of button 30. For example, pushing button 30 right and left arrows scrolls through days 93. As each day 93 is selected, it may be highlighted by any number of means known in the art. As days 93 are scrolled through in the right or left direction, date window 106 changes to automatically identify the date of each day highlighted and will automatically recycle to the days of each successive or previous week. Once the user selects a particular day and date he or she releases button 30 and uses the up or down button to scroll through the vertical section of menu 80 to select any of vertical menu items 82, 84, 86, 88, 90, and 92. The present invention allows a user to scroll the vertical menu items 82, 84, 86, 88, 90, and 92 prior to scrolling through horizontal menu items corresponding to the days of a week 93. A user selects one of vertical time menu items 82, 84, 86, 88, 90, and 92 by releasing button 30 when a desired menu item is highlighted. Upon selecting the items from menu 80, the microprocessor will process the stored time and photoactive radiation data and display the requested information on display 21.

By way of a first example and referring to FIG. 15, a user, on May 15 wishes to determine the photoactive radiation incident upon a site on Monday, April 30. The user energizes dosimeter device 20 and scrolls left through days to highlight Monday of day menu items 93 corresponding to day April 30 displayed in date window 106. The user can then scroll through and select one of vertical menu items 82, 84, 86, 88, 90, and 92. If the user selects menu item 84, CPU processes the data stored in EEROM 62 and produces output corresponding to the user's request for display. In the case of menu item 84, the dosimeter device 20 displays under time section 96a the times 7:04 a.m. and 8:15 p.m. on April 30. Dose section 96b will automatically display the average dose in window 102 and the total dose in sols in window 104 that occurred from 7:04 a.m. to 8:15 p.m. on April 30. For example, FIG. 15 shows 4.7 sols/hr in average dose window 102 and 62 sols in total/maximum window 104 incident upon the site from 7:04 a.m. to 8:15 p.m. on Monday, April 30.

Figure 16:
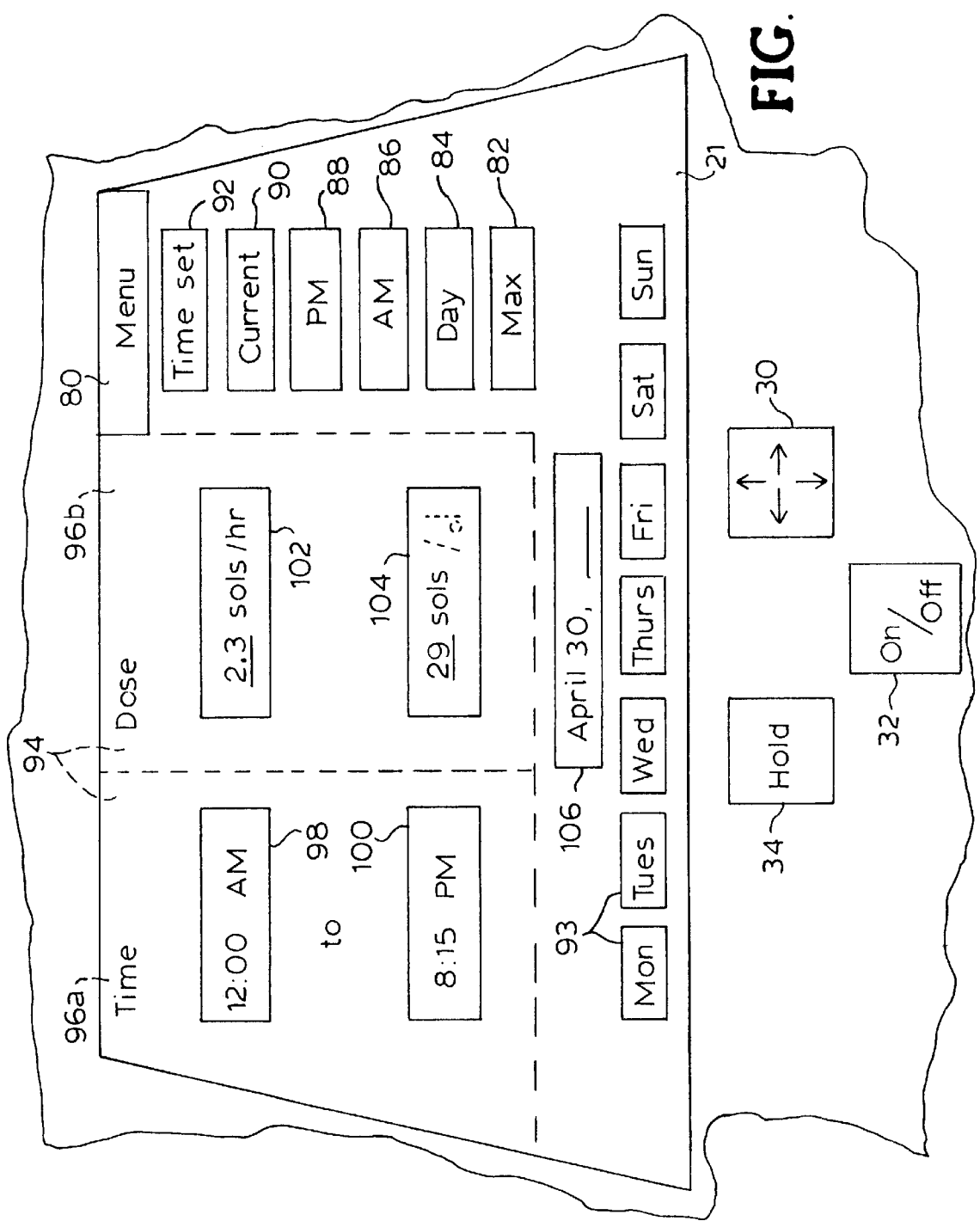
FIG. 16 is a schematic diagram of the display panel and switches shown incorporated into the first embodiment of the invention of FIG. 2, and operative to display a second selected photoactive radiation exposure data.

By way of a second example, FIG. 16 illustrates when a user selects menu item 88, and microprecessor displays in the earlier time window 98 and later time window 100 the time 12:00 p.m. and 8:15 p.m. on April 30, for example. On April 30$^{th}$, the average sols/hr displayed in window 102 are 2.3, and the total sols that occurred between 12:00 p.m. and 8:15 p.m. is 29.

The user can also select more than one day for display of average and total photoactive radiation incident on the particular site, by simultaneously holding down buttons 30 and 34 and scrolling through days 93. Upon releasing either button 30 or 34, the days selected and highlighted will be those days scrolled through while both buttons 30 and 34 were activated. Upon release of either button 30 or 34, the device will automatically display the average and total photoactive radiation incident at the particular site during the days selected, for example, Sunday, and Monday. Window 106, will indicate the dates, for example, April 30–May 1 (not shown).

When initially energized, dosimeter device 20 goes to default and displays the current intensity of photoactive radiation data in window 104. Menu item 92 is the time set select, allowing the user to set the device to the current time, day, month, and year.

As stated above, the invention provides a measurement expressed in user friendly units, sols, corresponding to the amount of sols typically incident upon a garden site, and then the user can compare that measurement with a brochure, catalog, or other reference material describing known plant requirements in the same user friendly units. The present invention also includes providing this information in connection with the sale of plant products to consumers. For example, upon measuring and determining the amount of incident photoactive radiation typical at a garden site, the gardener may then look for photoactive radiation information on labels or other materials used in connection with plant products to determine which plant product would grow best at the particular site characterized by a particular incident photoactive radiation.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention as set forth in the claims appended hereto.

What is claimed is:

1. A self-contained garden dosimeter device for continuously receiving, continuously recording, and periodically displaying at a selected site the level of intensity of light radiation striking said device; comprising:

a. a housing having internal and external surfaces adapted for mounting components of the device;

b. a support secured to said housing for supporting said housing above ground level at said site;

c. light sensing means comprising at least one light sensor means mounted to said housing and dependent on the continuing presence of light radiation within a green plant's radioactive spectrum striking said at least one light sensor means being operative to produce at least one analog output signal proportional to the level of intensity of said radiation received by said at least one light sensor means;

d. optical filter means including at least one optical filter mounted on said housing and positioned outwardly of said light sensor means and operative to filter light radiation received at said site such that the light radiation transmitted by said optical filter to said at least one light sensor means is within a green plant's photoactive radiation spectrum of approximately 400 to 700 nm, and wherein said at least one filter selectively attenuates the intensity of said photoactive radiation that has a sub-optimum effect on plant growth, such that said at least one sensor output signal due to the radiation striking said sensor means mimics the green plant's growth response to the said radiation within said photoactive radiation spectrum;

e. a central processing system mounted within said housing having an input and output means, said central processing system input means being connected to receive said analog output signal;

f. a digital display mounted on one of said surfaces and electrically connected to said output means of said processing system, said digital display having a window for displaying the amount of said photoactive radiation passing through said at least one optical filter and striking said at least one light sensor means at said selected site;

g. means connected to said central processing unit for requesting central processing unit output corresponding to the amount of photoactive radiation within a green plant's photoactive spectrum of approximately 400 to 700 nm and incident at a particular garden site as requested for presentation on said display; and h. a power source electrically coupled to said device for providing power thereto.

2. A self-contained garden dosimeter device as recited in claim 1, wherein said optical filter means comprises at least one hemispherical filter positioned outwardly of a complementary shaped hemispherical sensor, such that said at least one hemispherical filter and said hemispherical sensor receive radiation from opposing horizons.

3. A self-contained garden dosimeter device as recited in claim 1, wherein said light sensing means comprises at least two sensors, whereby the said output signal from each of said two sensors corresponds to a portion of the said plant photoactive radiation spectrum.

4. A self-contained garden dosimeter device as recited in claim 3, wherein said central processing system calculates a total output signal derived from said at least two sensor output signals.

5. A self-contained garden dosimeter device as recited in claim 1, wherein said central processing system calculates the amount of said photoactive radiation striking said sensor means and expresses said amount in sols.

6. A self-contained, garden dosimeter device as recited in claim 1, wherein said central processing system calculates the total light radiation striking said sensor means over a selected period of time and expresses said total in sols.

7. A self-contained, garden dosimeter device as recited in claim 1, wherein said central processing system calculates the average light radiation striking said sensor means over a selected period of time and expresses said average in units equivalent to a foot-candle level over a prescribed amount of time.

8. A self-contained, garden dosimeter device as recited in claim 1, wherein said photoactive radiation is displayed in units equivalent to foot-candle levels over a prescribed amount of time.

9. A self-contained, garden dosimeter device as recited in claim 1, wherein said photoactive radiation is displayed in sols.

10. A self-contained garden dosimeter device as recited in claim 1, wherein said output is displayed in units defined as sols.

11. A self-contained, garden dosimeter device as recited in claim 1, wherein said display further comprises:
   (i) a first section for displaying at least one date;
   (ii) a second section for displaying a time interval in a selected day;
   (iii) a third section for displaying the amount of light radiation striking said sensor at a selected time; and
   (iv) a fourth section of menu items comprising, time set menu selection, current radiation, selection menu, p.m. menu selection, a.m. menu selection, day menu selection, and maximum radiation menu selection.

12. A self-contained, garden dosimeter device as recited in claim 1, wherein said power source comprises a solar panel connected to a rechargeable battery to restore energy to said rechargeable battery.

13. A method for selecting plants for a particular garden site comprising the steps of: providing a self-contained dosimeter having at least one filter means, a sensing means comprised of at least one light sensor, a central processing system, and a display; placing said dosimeter at a selected garden site; energizing said dosimeter, said dosimeter detecting the amount of photoactive radiation striking said filter and sensing means and storing such amount in said central processing system, and upon request by a user displaying the amount of said photoactive radiation striking said filter and sensing means in standardized units of radiation.

14. A method for selecting plants for a particular garden site as recited in claim 13, further including the step of providing a reference containing a list of optimum photoactive light requirements for various plants expressed in standardized units of radiation.

15. A method for selecting plants for a particular garden site as recited in claim 13, further including the steps of providing labels attached to plant products indicating to consumers approximately the optimum amount of photoactive radiation expressed in said units as required by specific plant products.

16. A method for selecting plants for a particular garden site as recited in claim 13, wherein said standardized units of radiation are expressed as sols.

17. A method for selecting plants for a particular garden site as recited in claim 14, wherein said standardized units of radiation is expressed as sols.

18. A method for selecting plants for a particular garden site as recited in claim 13, further comprising calculating the average light radiation striking said filter and sensor means over a selected period of time, and displaying said average in standardized units on said display.

19. A method for selecting plants for a particular garden site as recited in claim 13, further comprising calculating the total light radiation striking said filter and sensor means over a selected period of time, and displaying said total in standardized units on said display.

20. A method for selecting plants for a particular garden site as recited in claim 19, wherein said units are defined as sols.

21. A self-contained garden dosimeter device for continuously receiving, continuously recording, and periodically displaying at a selected site the level of intensity of light radiation striking said device; comprising:

a. a housing having internal and external surfaces adapted for mounting components of the device;

b. a support secured to said housing for supporting said housing above ground level at said site;

c. light sensing means comprising at least one light sensor means mounted to said housing and dependent on the continuing presence of light radiation within a green plant's radioactive spectrum striking said at least one light sensor means being operative to produce at least one analog output signal proportional to the level of intensity of said radiation received by said at least one light sensor means;

d. optical filter means including at least one optical filter mounted on said housing and positioned outwardly of said light sensor means and operative to filter light radiation received at said site such that the light radiation transmitted by said optical filter to said at least one light sensor means is within a green plant's photoactive radiation spectrum of approximately 400 to 700 nm;

e. a central processing system mounted within said housing having an input and output means, said central processing system input means being connected to receive said analog output signal from said light sensing means;

f. a data storage device for storing data corresponding to the amount of said photoactive radiation striking said at least one sensor means at said selected site;

g. a digital display mounted on one of said surfaces and electrically connected to said output means of said processing system, said digital display having a window for displaying the amount of said photoactive radiation passing through said at least one optical filter and striking said at least one light sensor means at said selected site;

h. means connected to said storage device for requesting data corresponding to the amount of photoactive radiation within a green plant's photoactive spectrum of approximately 400 to 700 nm incident at a particular garden site at a time preceding such request, and for displaying said requested amount on said digital display; and i. a power source electrically coupled to said device for providing power thereto.

* * * * *

UNITED STATES PATENT AND TRADEMARK OFFICE
CERTIFICATE OF CORRECTION

PATENT NO.    : 6,114,687
DATED         : September 5, 2000
INVENTOR(S)   : Michael C. Sharp et al.

It is certified that error appears in the above-identified patent and that said Letters Patent is hereby corrected as shown below:

In the Drawings:
Figure 15, box 104, change "6Z sols" to read --62 sols--.

Figure 16, box 98, change "12:00 AM" to read --12:00 PM--.

In the Description:
Column 7,
Line 67, change "AD" to read --$A_D$--. (PTO error)

Column 8,
Line 40, change "An" to read --$A_n$--. (PTO error)
Line 49, change "AD" to read --$A_D$--. (PTO error)

Column 9,
Line 1, change "Sn" to read --$S_n$--. (PTO error)

Signed and Sealed this

Tenth Day of July, 2001

*Attest:*

Nicholas P. Godici

*Attesting Officer*

NICHOLAS P. GODICI
*Acting Director of the United States Patent and Trademark Office*